United States Patent
Leitner

(10) Patent No.: US 8,846,133 B2
(45) Date of Patent: Sep. 30, 2014

(54) METHOD FOR PRODUCING A PROTON-CONDUCTING MEMBRANE

(75) Inventor: Klaus Leitner, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 558 days.

(21) Appl. No.: 13/132,959

(22) PCT Filed: Dec. 5, 2009

(86) PCT No.: PCT/EP2009/008706
§ 371 (c)(1), (2), (4) Date: Jun. 6, 2011

(87) PCT Pub. No.: WO2010/063489
PCT Pub. Date: Jun. 10, 2010

(65) Prior Publication Data
US 2011/0236563 A1 Sep. 29, 2011

(30) Foreign Application Priority Data
Dec. 6, 2008 (EP) .................................... 08021238

(51) Int. Cl.
*B05D 5/12* (2006.01)

(52) U.S. Cl.
USPC ................ 427/58; 429/309; 429/314; 521/27

(58) Field of Classification Search
USPC ........................ 427/58; 521/27; 429/309, 314
See application file for complete search history.

(56) References Cited

U.S. PATENT DOCUMENTS

| | | | |
|---|---|---|---|
| 3,783,137 A * | 1/1974 | Gerber | ........................... 528/208 |
| 4,191,618 A | 3/1980 | Coker et al. | |
| 4,212,714 A | 7/1980 | Coker et al. | |
| 4,333,805 A | 6/1982 | Davidson et al. | |
| 7,288,603 B2 * | 10/2007 | Sakaguchi et al. | ............. 525/411 |
| 7,384,552 B2 | 6/2008 | Calundann et al. | |
| 7,540,984 B2 | 6/2009 | Calundann et al. | |
| 7,736,778 B2 | 6/2010 | Uensal et al. | |
| 2004/0096734 A1 | 5/2004 | Calundann et al. | |
| 2004/0127588 A1 * | 7/2004 | Calumdann et al. | ............ 521/27 |
| 2005/0244695 A1 * | 11/2005 | Kiefer et al. | ..................... 429/33 |
| 2006/0008690 A1 * | 1/2006 | Uensal et al. | ................... 429/33 |
| 2006/0079392 A1 * | 4/2006 | Baurmeister et al. | ............. 502/4 |
| 2008/0050514 A1 * | 2/2008 | Calundann et al. | ........... 427/115 |
| 2008/0187807 A1 | 8/2008 | Schmidt et al. | |

FOREIGN PATENT DOCUMENTS

| | | |
|---|---|---|
| DE | 101 17 686 A1 | 10/2002 |
| DE | 10246459 A1 | 4/2004 |
| DE | 102005020604 A1 | 11/2006 |
| JP | 2001118591 | 4/2001 |
| WO | WO-02/088219 A1 | 11/2002 |
| WO | WO-2005/011039 A2 * | 2/2005 |
| WO | WO-2008/031554 A1 * | 3/2008 |

* cited by examiner

*Primary Examiner* — Peter D. Mulcahy
*Assistant Examiner* — Henry Hu
(74) *Attorney, Agent, or Firm* — Drinker Biddle & Reath LLP

(57) ABSTRACT

The invention relates to a method for the production of a proton-conducting polymer membrane on the basis of polyazoles, comprising the steps of A) converting one or more aromatic tetra-amino compounds having one or more aromatic carboxylic acids, which contain at least two acid groups per carboxylic acid monomer, to form a salt comprising diammonium catious and carboxylate anions, B) mixing the salt from step A) with polyphosporic acid to form a solution and/or dispersion, C) applying a layer using the mixture according to step B) onto a carrier, D) heating the planar formation/layer obtained according to step C) to temperatures of up to 350° C., preferably up to 280° C., to form the polyazole polymers, E) treating the membrane formed in step D) in the presence of moisture at temperatures and for a duration sufficient until it is self-supporting.

26 Claims, No Drawings

METHOD FOR PRODUCING A PROTON-CONDUCTING MEMBRANE

CROSS-REFERENCE TO RELATED APPLICATIONS

This application is a national stage application (under 35 U.S.C. §371) of PCT/EP2009/008706, filed Dec. 5, 2009, which claims benefit of EP 08 021 238.4, filed Dec. 6, 2008.

BACKGROUND OF THE INVENTION

The present invention relates to a novel process for producing a proton-conducting polymer membrane based on polyazoles, which, owing to its excellent chemical and thermal properties, can be used widely and is particularly suitable as polymer-electrolyte membrane (PEM) in PEM fuel cells.

Polyazoles such as polybenzimidazoles (®Celazole) have been known for a long time. Such polybenzimidazoles (PBI) are usually produced by reacting 3,3',4,4'-tetraaminobiphenyl with terephthalic acid or esters thereof in the melt. The prepolymer formed solidifies in the reactor and is subsequently broken up mechanically. The pulverulent prepolymer is subsequently fully polymerized in a solid-state polymerization at temperatures of up to 400° C. to give the desired polybenzimidazoles.

To produce polymer films, the FBI is, in a further step, dissolved in polar, aprotic solvents such as dimethylacetamide (DMAc) and a film is produced by classical methods.

The basic polyazole films can subsequently be doped with concentrated phosphoric acid or sulfuric acid and then act as proton conductors and separators in polymer electrolyte membrane fuel cells (PEM fuel cells).

The acid-doped polymer membranes based on polyazoles which can be obtained in this way display an advantageous property profile. However, owing to the applications desired for PEM fuel cells, especially in the automobile sector and decentralized power and heat generation (stationary applications), these still require overall improvement.

WO 02/088219 therefore proposes the use of a proton-conducting polymer membrane based on polyazoles, which can be obtained by a process comprising the steps A) Mixing of one or more aromatic tetraamino compounds with one or more aromatic carboxylic acids or esters thereof which comprise at least two acid groups per carboxylic acid monomer, or mixing of one or more aromatic and/or heteroaromatic diamino carboxylic acids, in polyphosphoric acid to form a solution and/or dispersion, B) Application of a layer to a support using the mixture according to step A), C) Heating of the sheet-like structure/layer which can be obtained according to step B) under inert gas to temperatures of up to 350° C., preferably up to 280° C., to form the polyazole polymer, D) Treatment of the membrane formed in step C) until it is self-supporting.

However, such a procedure is relatively time-consuming and complicated. Furthermore, the polycondensation or the reaction time is not always completely reproducible, which frequently makes the production process more difficult.

Thus, for example, a reaction time of more than 35 hours is usually required for the polycondensation of 3,3',4,4'-tetraaminobiphenyl with terephthalic acid in polyphosphoric acid. Furthermore, the precise stoichiometry of the two monomers has to be adhered to since otherwise a sufficiently high molecular weight is not built up.

A further problem is the necessity of freshly premixing the monomers. For the two monomers to become similarly well distributed in the polyphosphoric acid, they have to be premixed in powder form and added as a homogeneous mixture to the polyphosphoric acid. However, this premixing has to be carried out separately for each batch. If larger batches of monomer mixtures were to be produced beforehand, the monomers would demix during storage.

Finally, the different dissolution rates of the monomers also lead to additional problems. When the monomer mixture is stirred into and dissolved in the polyphosphoric acid, the 3,3',4,4'-tetraaminobiphenyl goes into solution substantially more quickly than the terephthalic acid. It is frequently observed that residues of monomer powder accumulate on the stirrer or on the vessel walls and are thus withdrawn from the reaction solution. This leads to a nonstoichiometric ratio of the two monomers in the reaction mixture, which in turn has an adverse effect on the build-up of the molar mass in the polycondensation.

BRIEF SUMMARY OF THE INVENTION

It was therefore an object of the present invention to provide possible ways of improving the process for producing a proton-conducting polymer membrane based on polyazoles further. A process which can be carried out on an industrial scale and very inexpensively in a very simple way is sought. The process should, in particular, provide very short reaction times and very uniform and reproducible reactions. Furthermore, better scale-up of the reaction batch and the production of particularly uniform polymers were sought.

These and further objects which can be derived directly from the relationships discussed at the outset are achieved by a process having all the features of the present claim 1. Particularly advantageous modifications of the process are described in the dependent claims.

Provision of a process for producing a proton-conducting polymer membrane based on polyazoles, which comprises the steps A) Reaction of one or more aromatic tetraamino compounds with one or more aromatic carboxylic acids comprising at least two acid groups per carboxylic acid monomer to form a salt comprising diammonium cations and carboxylate anions, B) Mixing of the salt from step A) with polyphosphoric acid to form a solution and/or dispersion, C) Application of a layer to a support using the mixture according to step B), D) Heating of the sheet-like structure/layer which can be obtained according to step C) to temperatures of up to 350° C., preferably up to 280° C., to form the polyazole polymer, E) Treatment of the membrane formed in step D) in the presence of moisture at temperatures and for a time which are sufficient for the membrane to be self-supporting, makes it possible, in a manner which could not readily have been foreseen, to provide a process which allows production of a proton-conducting polymer membrane based on polyazoles in a comparatively simple way, industrially and comparatively inexpensively. The process is characterized by comparatively short reaction times and particularly uniform and reproducible reactions. Furthermore, it allows the reaction batch to be scaled up more readily and allows the production of particularly uniform polymers.

DETAILED DESCRIPTION OF THE INVENTION

In addition, numerous further advantages are obtained:

The use of a salt instead of the two monomers enables premixing of the individual batches to be dispensed with. It is therefore possible to make up relatively large amounts of monomer mixtures in the form of the salt beforehand and, if required, store the mixtures temporarily without demixing of the monomers having to be feared.

The polycondensation of the salt proceeds more quickly than the polycondensation of the two monomers.

Salt residues which could accumulate on the stirrer and the walls of the reaction vessel lead less easily to deviations from the stoichiometry since the monomers are withdrawn in equimolar amounts from the reaction mixture.

The process of the invention comprises, as first step A), the reaction of one or more aromatic tetraamino compounds with one or more aromatic carboxylic acids comprising at least two acid groups per carboxylic acid monomer, with the reaction leading to the formation of a salt comprising diammonium cations and carboxylate anions which are preferably present in equimolar amounts.

Furthermore, it is particularly advantageous for the purposes of the present invention for both the tetraamino compounds and the carboxylic acids to be used in pure form and not in the form of a salt, for example a tetraammonium salt or a carboxylate salt.

The reaction of the tetraamino compounds with the carboxylic acids can be aided by use of a solvent which preferably dissolves both components and in particular the resulting salt. Polar solvents, preferably those having dielectric constants of greater than 15, particularly preferably water, ethanol, dimethylformamide, dimethylacetamide, dimethyl sulfoxide and N-methyl-2-pyrrolidone, in particular water and ethanol, have been found to be particularly useful for this purpose.

The dielectric constant indicates the factor by which the capacitance of a capacitor which is (theoretically) present in a vacuum is increased when materials having dielectric properties (dielectrics) are introduced between the plates. Values for dielectric constants are tabulated in numerous reference works and are preferably based on 20° C. Further details may be found, in particular, in Kohlrausch, Praktische Physik 3, pages 263, 265, Stuttgart, Teubner 1986 and CRC Handbook of Chemistry and Physics, 1990-1991, 71st edition, sections 9-9 to 9-12.

Step A) is preferably carried out at a temperature in the range from 25° C. to <100° C. for from 0.1 hour to 10 hours. A procedure in which the tetraamino compounds and the carboxylic acids are mixed in a very precise stoichiometry and combined with a solvent is particularly advantageous here. The ratio of the two monomers is ideally equimolar (1:1), preferably a molar ratio in the range from 0.99:1 to 1:0.99, based on the amino groups and the carboxylic acid groups.

The solution or suspension of the two monomers in the solvent is then preferably heated at a temperature in the range from 30° C. to <100° C., particularly preferably from 50° C. to <100° C., advantageously boiled under reflux, for a time in the range from 0.1 h to 10 h, particularly preferably from 0.5 h to 5 h, in particular from 1 h to 3 h. The solution or suspension comprising the salt formed can be separated off from other constituents and isolated.

The solvent is subsequently removed in a suitable way, preferably by evaporation or rotary evaporation, and the salt is obtained in pure form and can then be subjected to temporary storage or be used directly in the next steps.

The aromatic and/or heteroaromatic tetraamino compounds used according to the invention are preferably 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and/or 3,3',4,4'-tetraaminodiphenyldimethylmethane.

The aromatic carboxylic acids used according to the invention are preferably dicarboxylic acids, tricarboxylic acids and/or tetracarboxylic acids, in particular dicarboxylic acids. The term aromatic carboxylic acids also encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid,1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid and/or 4-carboxycinnamic acid.

The aromatic tricarboxylic acids are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid and/or 3,5,4'-biphenyltricarboxylic acid.

The aromatic tetracarboxylic acids are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and/or 1,4,5,8-naphthalenetetracarboxylic acid.

The heteroaromatic carboxylic acids used according to the invention are preferably heteroaromatic dicarboxylic acids, tricarboxylic acids and/or tetracarboxylic acids, in particular dicarboxylic acids. For the purposes of the present invention, heteroaromatic carboxylic acids are aromatic systems which comprise at least one nitrogen, oxygen, sulfur or phosphorus atom in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid and/or benzimidazole-5,6-dicarboxylic acid.

The content of tricarboxylic acids and/or tetracarboxylic acids, based on dicarboxylic acids used, is preferably in the range from 0 to 30 mol %, preferably from 0.1 to 20 mol %, in particular from 0.5 to 10 mol %.

Preference is given to using mixtures of at least two different aromatic carboxylic acids in step A). Particular preference is given to using mixtures which contain aromatic carboxylic acids together with heteroaromatic carboxylic acids. The mixing ratio of aromatic carboxylic acids to heteroaromatic carboxylic acids is preferably in the range from 1:99 to 99:1, preferably from 1:50 to 50:1.

These mixtures are preferably mixtures of N-heteroaromatic dicarboxylic acids and aromatic dicarboxylic acids. Nonlimiting examples of such dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid,1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoro-methylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid and 2,5-pyrazinedicarboxylic acid.

The polyphosphoric acid used in step B) is a commercial polyphosphoric acid as can be obtained, for example, from Riedel-de Haen. The polyphosphoric acids $H_{n+2}P_nO_{3n+1}$ (n>1) preferably have a content calculated as $P_2O_5$ (acidimetric) of at least 75% by weight, particularly preferably at least 79% by weight, in particular at least 82% by weight. Instead of a solution or dispersion, a suspension can also be produced in step B).

The mixture produced in step B) preferably has a weight ratio of polyphosphoric acid to the sum of all monomers of from 1:10 000 to 10 000:1, preferably from 1:1000 to 1000:1, in particular from 1:100 to 100:1.

The layer formation according to step C) is effected by means of measures known per se (casting, spraying, doctor blade coating) which are known from the prior art in the field of polymer film production. All supports which are inert under the conditions are suitable as supports. To adjust the viscosity, the solution can optionally be admixed with phosphoric acid, in particular concentrated phosphoric acid, 85%. In this way, the viscosity can be set to the desired value and the formation of the membrane aided.

The layer produced according to step C) has a thickness in the range from 20 μm to 4000 μm, preferably in the range from 30 μm to 3500 μm, in particular from 50 μm to 3000 μm.

The polymerization is carried out in step D). For this purpose, the mixture is heated to a temperature of up to 350° C., preferably up to 280° C., in particular up to 250° C.

The polymerization brought about by heating the sheet-like structure in step D) can also be carried out before step C). Instead of the polymerization in step D), the mixture from step B) can also be heated in a closed reactor and the layer formation according to step C) can subsequently be carried out. In this variant, the water formed by the polycondensation can be removed in its entirety or in part before the layer is produced according to step C). The removal of the water can also be effected by use of anhydrides. If the polycondensation is carried out as described above, the heating of the sheet-like structure or the layer according to step D) can be entirely or partially dispensed with or can at least be abbreviated in terms of the temperature and/or time.

The polyazole-based polymer formed in step D) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

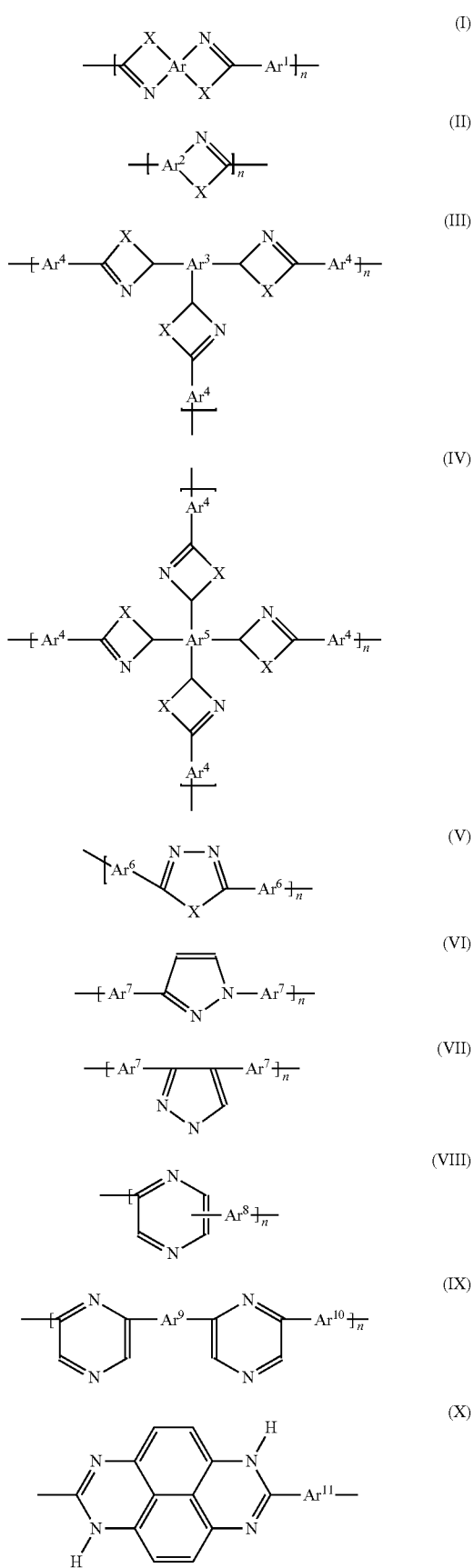

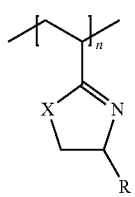 (XI)

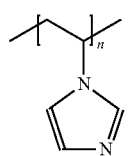 (XII)

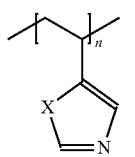 (XIII)

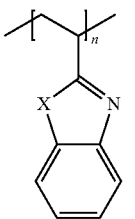 (XIV)

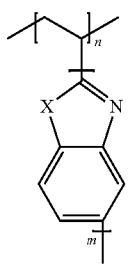 (XV)

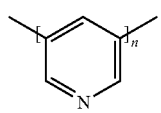 (XVI)

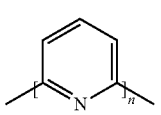 (XVII)

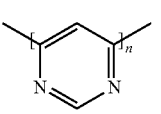 (XVIII)

(XIX)

(XX)

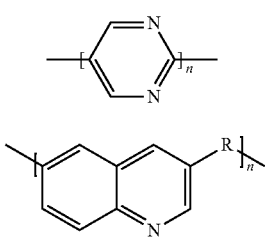

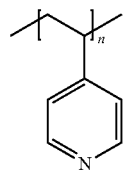 (XXI)

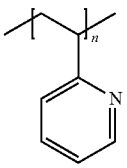 (XXII)

where
the radicals Ar are identical or different and are each a tetravalent aromatic or heteroaromatic group which can comprise one or more rings,
the radicals $Ar^1$ are identical or different and are each a divalent aromatic or heteroaromatic group which can comprise one or more rings,
the radicals $Ar^2$ are identical or different and are each a divalent or trivalent aromatic or heteroaromatic group which can comprise one or more rings,
the radicals $Ar^3$ are identical or different and are each a trivalent aromatic or heteroaromatic group which can comprise one or more rings,
the radicals $Ar^4$ are identical or different and are each a trivalent aromatic or heteroaromatic group which can comprise one or more rings,
the radicals $Ar^5$ are identical or different and are each a tetravalent aromatic or heteroaromatic group which can comprise one or more rings,
the radicals $Ar^6$ are identical or different and are each a divalent aromatic or heteroaromatic group which can comprise one or more rings,
the radicals $Ar^7$ are identical or different and are each a divalent aromatic or heteroaromatic group which can comprise one or more rings,
the radicals $Ar^8$ are identical or different and are each a trivalent aromatic or heteroaromatic group which can comprise one or more rings,
the radicals $Ar^9$ are identical or different and are each a divalent or trivalent or tetravalent aromatic or heteroaromatic group which can comprise one or more rings,
the radicals $Ar^{10}$ are identical or different and are each a divalent or trivalent aromatic or heteroaromatic group which can comprise one or more rings,
the radicals $Ar^{11}$ are identical or different and are each a divalent aromatic or heteroaromatic group which can comprise one or more rings,
the radicals X are identical or different and are each oxygen, sulfur or an amino group bearing a hydrogen atom, a group having 1-20 carbon atoms, preferably a branched or unbranched allyl or alkoxy group, or an aryl group as further radical,
the radicals R are identical or different and are each hydrogen, an alkyl group or an aromatic group, where R in formula (XX) is not hydrogen, and
n, m are each an integer greater than or equal to 10, preferably greater than or equal to 100.
Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

Here, $Ar^1, Ar^4, Ar^6, Ar^7, Ar^8, Ar^9, Ar^{10}, Ar^{11}$ can have any substitution pattern; in the case of phenylene, for example, $Ar^1, Ar^4, Ar^6, Ar^7, Ar^8, Ar^9, Ar^{10}, Ar^{11}$ can be ortho-, meta- or para-phenylene. Particularly preferred groups are derived from benzene and biphenylene which may optionally also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, hydroxyl groups or short-chain alkyl groups such as methyl or ethyl groups.

Preference is given to polyazoles having recurring units of the formula (I) in which the radicals X are identical within a recurring unit.

The polyazoles can in principle also have different recurring units which differ, for example, in their radical X. However, preference is given to only identical radicals X being present in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In a further embodiment of the present invention, the polymer comprising recurring azole units is a copolymer or blend comprising at least two units of the formula (I) to (XXII) which differ from one another. The polymers can be present as block copolymers (diblock, triblock), random copolymers, periodic copolymers and/or alternating polymers.

In a particularly preferred embodiment of the present invention, the polymer comprising recurring azole units is a polyazole which comprises only units of the formula (I) and/or (II).

The number of recurring azole units in the polymer is preferably an integer greater than or equal to 10. Particularly preferred polymers comprise at least 100 recurring azole units.

For the purposes of present invention, polymers comprising recurring benzimidazole units are preferred. Some examples of the extremely advantageous polymers comprising recurring benzimidazole units are described by the following formulae:

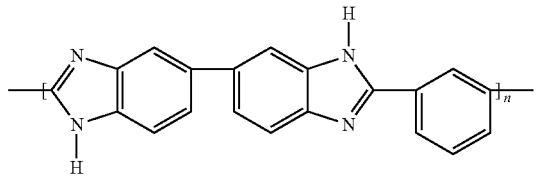 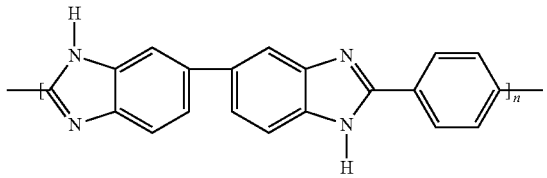

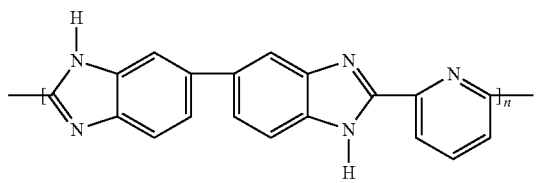 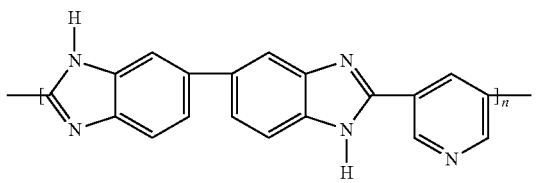

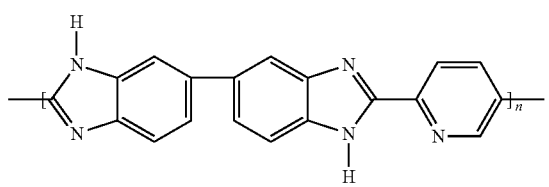 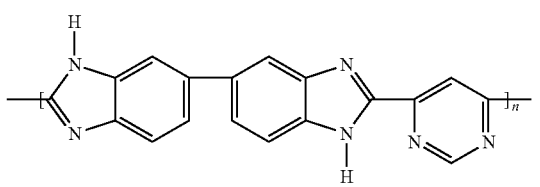

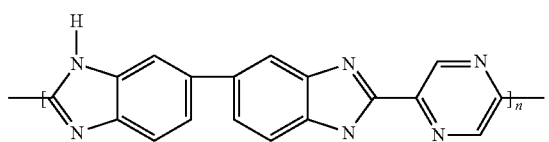 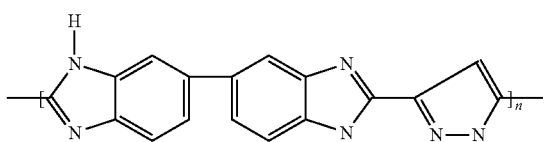

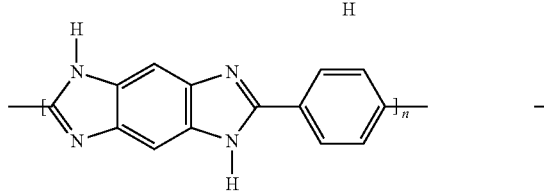 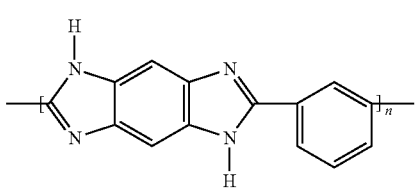

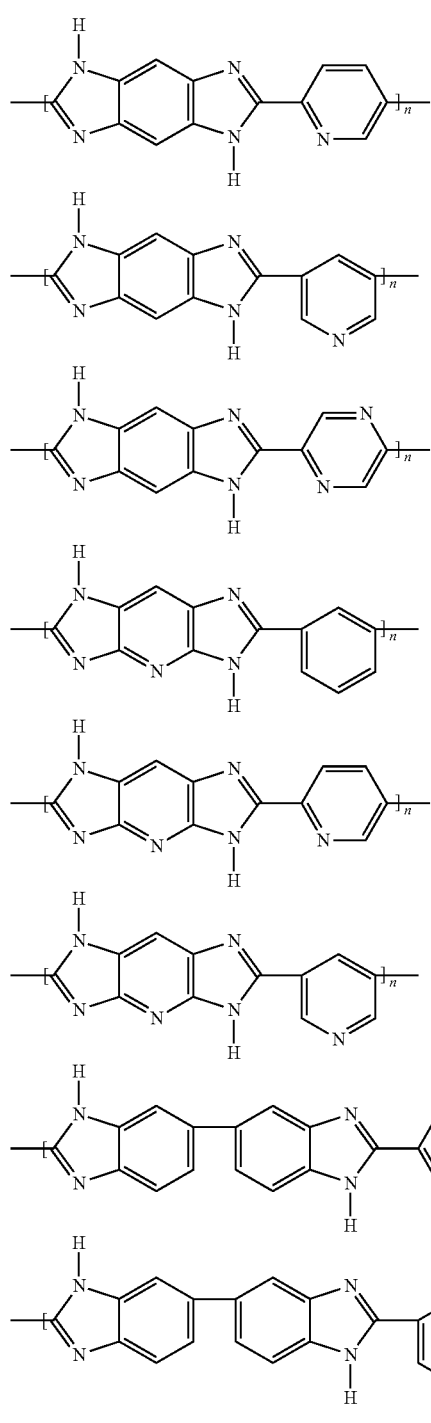
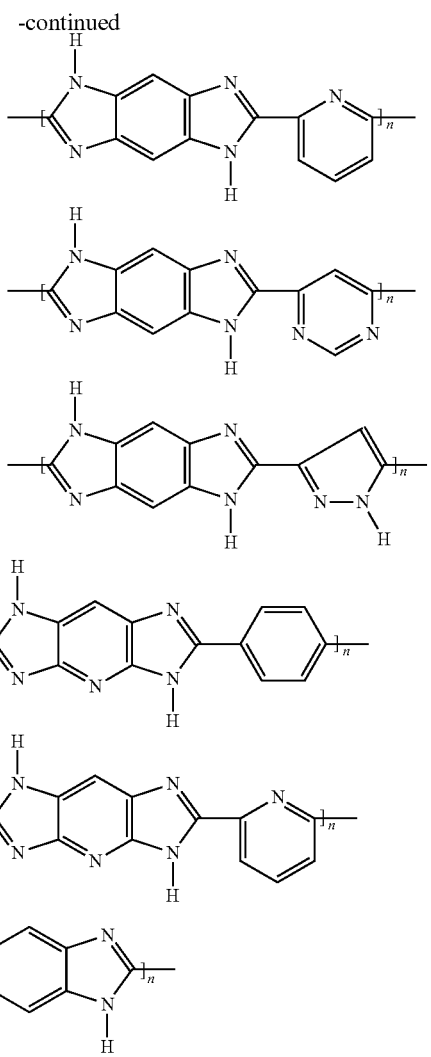
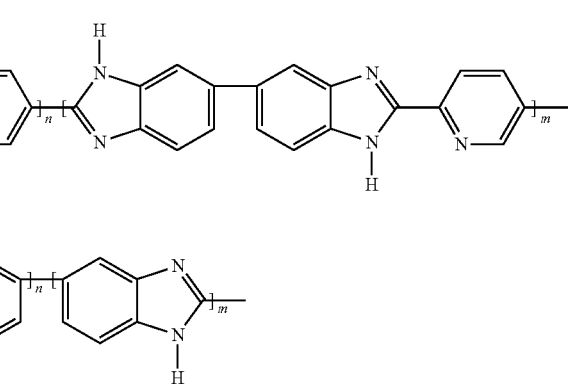

where n and m are each an integer greater than or equal to 10, preferably greater than or equal to 100.

The polyazoles which can be obtained by means of the process described, but in particular the polybenzimidazoles, have a high molecular weight. Measured as intrinsic viscosity, this is preferably at least 1,4 dl/g and is thus significantly above that of commercial polybenzimidazole (IV<1.1 dl/g).

If the salt formed in step A) also comprises tricarboxylic acids and/or tetracarboxylic acids, these bring about branching/crosslinking of the polymer formed. This contributes to improving the mechanical properties of the membrane formed.

In a variant of the process, the formation of oligomers and/or polymers can be brought about by heating the mixture from step B) to temperatures of up to 350° C., preferably up to 280° C. Depending on the temperature and time selected, the subsequent heating in step D) can be partially or entirely omitted. This variant is also provided by the present invention.

Furthermore, it has been found that when aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid are used, the temperature in step D), or in step B) if the formation of oligomers and/or polymers in step B) is desired, is advantageously in the range up to 300° C., preferably in the range from 100° C. to 250° C.

The treatment of the membrane in step E) is preferably carried out at temperatures above 0° C. and less than 150° C., preferably at temperatures in the range from 10° C. to 120° C., in particular in the range from room temperature (20° C.) to 90° C., in the presence of moisture or water and/or water vapor and/or water-comprising phosphoric acid having a concentration of up to 85%. The treatment is preferably carried out under atmospheric pressure, but can also be carried out under superatmospheric pressure. It is important that the treatment occurs in the presence of sufficient moisture, as a result of which the polyphosphoric acid present contributes, by partial hydrolysis to form low molecular weight polyphosphoric acid and/or phosphoric acid, to strengthening of the membrane.

The partial hydrolysis of polyphosphoric acid in step E) leads to strengthening of the membrane and to a decrease in the layer thickness and preferably to formation of a membrane which has a thickness in the range from 15 μm to 3000 μm, preferably from 20 μm to 2000 μm, in particular from 20 μm to 1500 μm, and is self-supporting.

The intramolecular and intermolecular structures (interpenetrating networks IPN) present in the polyphosphoric acid layer formed in step C) lead, in step D), to ordered membrane formation which is responsible for the particular properties of the membrane formed. The sol/gel transition which also takes place leads to formation of the particular membrane structure.

The upper temperature limit for the treatment according to step E) is generally 150° C. If moisture is present for an extremely short time, for example in the case of superheated steam, this steam can also be hotter than 150° C. Here, particular preference is given to steam having a temperature of up to 180° C., particularly preferably up to 150° C. The duration of the treatment is important for the upper limit to the temperature.

The partial hydrolysis (step E) can also be carried out in controlled-atmosphere chambers, with the hydrolysis being able to be controlled in a targeted manner under defined humidity conditions. Here, the humidity can be set in a targeted manner by means of the temperature or the saturation of the contacting surroundings, for example gases such as air, nitrogen, carbon dioxide or other suitable gases, or steam. The treatment time depends on the parameters selected above.

Furthermore, the treatment time depends on the thickness of the membrane.

In general, the treatment time is in the range from a few seconds to minutes, for example in the presence of superheated steam, or up to entire days, for example in air at room temperature and a low relative atmospheric humidity. The treatment time is preferably in the range from 10 seconds to 300 hours, in particular from 1 minute to 200 hours.

If the partial hydrolysis is carried out at room temperature (20° C.) using ambient air having a relative atmospheric humidity of 40%-80%, the treatment time is preferably in the range from 1 hour to 200 hours.

The membrane obtained according to step E) can be self-supporting, i.e. it can be detached without damage from the support and then optionally be processed further directly. The self-supporting embodiment allows further handling of the membrane.

The concentration of phosphoric acid and thus the conductivity of the polymer membrane can be adjusted via the degree of hydrolysis, i.e. the duration, temperature and ambient humidity. According to the invention, the concentration of the phosphoric acid is reported as mole of acid per mole of repeating unit of the polymer. For the purposes of the present invention, a concentration (mole of phosphoric acid per repeating unit of the formula (III), e.g. polybenzimidazole) is preferably in the range from 10 to 50, in particular from 12 to 40. Such high degrees of doping (concentrations) are very difficult or impossible to obtain by doping of polyazoles with commercially available ortho-phosphoric acid.

After the treatment according to step E), the membrane can also be crosslinked on the surface by action of heat in the presence of atmospheric oxygen. This curing of the membrane surface effects an additional improvement in the properties of the membrane.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is here preferably in the range from 5 kGy to 200 kGy.

The polymer membrane which can be obtained according to the invention has improved materials properties compared to the doped polymer membranes known hitherto. In particular, it displays better performance compared to known doped polymer membranes. This is based on, in particular, an improved proton conductivity. The latter is at least 0.1 S/cm, preferably at least 0.11 S/cm, in particular at least 0.12 S/cm, at temperatures or 120° C.

To improve the use properties further, fillers, in particular proton-conducting fillers, and additional acids can additionally be added to the membrane. The addition can be carried out either in step A or B or after the polymerization.

Nonlimiting examples of proton-conducting fillers are sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, ($NH_4+$) zeolites, sheet silicates, framework silicates, H-natrolite, H-mordenite, $NH_4$-analcine, $NH_4$-sodalite, $NH_4$-gallate, H-montmorillonite acids such as HClO$_4$, SbF$_5$ fillers such as carbides, in particular SiC, Si$_3$N$_4$, fibers, in particular glass fibers, glass powders and/or polymer fibers, preferably based on polyazoles.

Furthermore, this membrane can also comprise perfluorinated sulfonic acid additives (0.1-20% by weight, preferably 0.2-15% by weight, very particularly preferably 0.2-10% by weight). These additives lead to an improvement in performance, in the vicinity of the cathode to an increase in the oxygen solubility and oxygen diffusion and to a reduction in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140 (4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136 (2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can also comprise additives which scavenge (primary antioxidants) or destroy (secondary antioxidants) free peroxide radicals produced in the reduction of oxygen during operation and thereby, as described in JP2001118591 A2, improve the life and stability of the membrane and membrane-electrode assembly. The function and molecular structures of such additives are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:

bis(trifluoromethyl) nitroxide, 2,2-diphenyl-1-picrinylhydrazyl, phenols, alkylphenols, sterically hindered alkylphenols, for example Irganox, aromatic amines, sterically hindered amines, for example Chimassorb; sterically hindered hydroxylamines, sterically hindered alkylamines, sterically hindered hydroxylamines, sterically hindered hydroxylamine ethers, phosphites, for example Irgafos, nitrosobenzene, methyl-2-nitrosopropane, benzophenone, benzaldehyde tert-butyl nitrone, cysteamine, melamines, lead oxides, manganese oxides, nickel oxides, cobalt oxides.

Possible fields of use of the doped polymer membranes according to the invention include, inter alia, use in fuel cells, in electrolysis, in capacitors and in battery systems. Owing to their property profile, the doped polymer membranes are preferably used for membrane-electrode assemblies for fuel cells.

Further information about membrane-electrode assemblies may be found in the specialist literature, in particular the patents U.S. Pat. Nos. 4,191,618, 4,212,714 and 4,333,805. The disclosure in respect of the structure and production of membrane-electrode assemblies and also the electrodes, gas diffusion layers and catalysts to be selected comprised in the abovementioned references [U.S. Pat. Nos. 4,191,618, 4,212, 714 and 4,333,805] is hereby incorporated by reference as part of the description.

In one variant of the present invention, membrane formation can occur directly on the electrode rather than on a support. The treatment according to step E) can be correspondingly shortened in this way since the membrane no longer has to be self-supporting. Such a membrane is also provided by the present invention.

The invention is illustrated below by means of examples, without these constituting a restriction of the scope of the invention.

EXAMPLE 1

Preparation of the Monomer Salt of Terephthalic Acid (TPA) and 3,3-4,4-tetraaminobiphenyl (TAB)

24.79 g of TAB
19.21 g of TPA
600.0 g of H$_2$O were boiled under reflux in a 2 l flask provided with high-speed stirrer and condenser for 2.5 hours (the bath temperature was 130° C.). This suspension was subsequently cooled by means of an ice bath. The ice bath was changed so that the temperature of the suspension was close to 0° C. This cooled suspension was filtered through a blue band filter and the filter cake was washed with ~200 ml of ice water (the edge of the flask had a relatively heavy deposit of product). The powder was dried overnight at 60° C. under a gentle stream of N$_2$ in a vacuum drying oven.

Yield: 41.6 g

EXAMPLE 2

Preparation of the Monomer Salt of Terephthalic Acid (TPA) and 3,3-4,4-tetraaminobiphenyl (TAB)

70 ml of DMSO (dimethyl sulfoxide)
24.79 g of TAB (3,3-4,4-tetraaminobiphenyl)
19.21 g of TPA (terephthalic acid)
150 g of H$_2$O The DMSO was heated to 115° C. in a conical flask provided with magnetic stirrer and condenser. The TAB and the TPA were subsequently added a little at a time. This saturated solution was maintained at 115° C. for 30 minutes. The solution was then cooled and precipitated in ice water. The fine precipitated product was filtered off with suction and, since the filter cake still smelled strongly of DMSO, washed 5 times with ~300 ml of ice water. The powder was dried overnight at 60° C. under a gentle stream of N$_2$ in a vacuum drying oven.

Yield: 42.8 g

EXAMPLE 3

Preparation of the Monomer Salt of Terephthalic Acid (TPA) and 3,3-4,4-tetraaminobiphenyl (TAB)

28.1705 g of TAB
21.8295 g of TPA
100.0 g of absolute ethanol were boiled under reflux in a 250 ml flask provided with high-speed stirrer and condenser for 2.5 hours (the bath temperature was 100° C.). This suspension was subsequently cooled by means of an ice bath. The cooled suspension was poured into a Teflon dish. It had to be rinsed in by means of about 100 g of ethanol (total solvent: about 200 g) since the "salt" had partly solidified as a crust at the bottom (broken up with a glass rod).

The product was dried over the weekend in a stream of $N_2$ at RT and under reduced pressure in a drying oven.

| Yield: | about 48.7 g | |
|---|---|---|
| Analysis: | carbon C: | 62.4 g/100 g |
| | oxygen O: | 18.8 g/100 g |
| | nitrogen N: | 12.6 g/100 g |
| | hydrogen H: | 5.0 g/100 g |

The invention claimed is:

1. A process for producing a proton-conducting polymer membrane based on polyazoles, which comprises the steps
A) Reacting, in a solvent having a dielectric constant greater than 15, one or more aromatic tetraamino compounds with one or more aromatic carboxylic acids comprising at least two acid groups per carboxylic acid monomer to form a salt comprising diammonium cations and carboxylate anions, wherein said salt is isolated for further handling,
B) Mixing of the salt from step A) with polyphosphoric acid to form a solution or dispersion,
C) Applying a layer to a support using the mixture according to step B),
D) Heating the sheet-like structure/layer obtained according to step C) to temperatures of up to 350° C. to form the polyazole polymer,
E) Treating the membrane formed in step D) in the presence of moisture at temperatures and for a time which are sufficient for the membrane to be self-supporting.

2. The process according to claim 1, wherein the salt formed in step A) comprises equimolar amounts of ammonium groups and carboxylate groups.

3. The process according to claim 1, wherein the reaction of step A) is carried out in a polar solvent.

4. The process according to claim 3, wherein the reaction is carried out in water, ethanol, dimethylformamide, dimethylacetamide, dimethyl sulfoxide or N-methyl-2-pyrrolidone.

5. The process according to claim 1, wherein step A) is carried out at a temperature in the range from 25° C. to 100° C. for from 0.1 hour to 10 hours.

6. The process according to claim 1, wherein the aromatic tetraamino compound is 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane or 3,3',4,4'-tetraaminodiphenyldimethylmethane or a mixture thereof.

7. The process according to claim 1, wherein the aromatic dicarboxylic acid is isophthalic acid, terephthalic acid, phthalic acid, 5-hydroxyisophthalic acid, 4-hydroxyisophthalic acid, 2-hydroxyterephthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid,1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid or 4-carboxycinnamic acid or a mixture thereof.

8. The process according to claim 1, wherein the aromatic carboxylic acid is a tricarboxylic acid.

9. The process according to claim 1, wherein the aromatic carboxylic acid is a 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid or 2,4,6-pyridinetricarboxylic acid or a mixture thereof.

10. The process according to claim 1, wherein the aromatic carboxylic acid is tetracarboxylic acid.

11. The process according to claim 1, wherein the aromatic carboxylic acid is benzene-1,2,4,5-tetracarboxylic acid, naphthalene-1,4,5,8-tetracarboxylic acid, 3,5,3',5'-biphenyltetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid or 1,4,5,8-naphthalenetetracarboxylic acid.

12. The process according to claim 8, wherein the content of tricarboxylic acid, based on the dicarboxylic acid used, is in the range from 0.1 mol % to 20 mol %.

13. The process according to claim 10, wherein the content of tetracarboxylic acid, based on the dicarboxylic acid used, is in the range from 0.1 mol % to 20 mol %.

14. The process according to claim 1, wherein the carboxylic acid is heteroaromatic dicarboxylic acids, tricarboxylic acids and/or tetracarboxylic acids comprising at least one nitrogen, oxygen, sulfur or phosphorus atom in the aromatic.

15. The process according to claim 1, wherein the carboxylic acid is heteroaromatic dicarboxylic acids, tricarboxylic acids and/or tetracarboxylic acids comprising at least one nitrogen, oxygen, sulfur or phosphorus atom in the pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid or benzoimidazole-5,6-dicarboxylic acid or a mixture thereof.

16. The process according to claim 1, wherein a polyphosphoric acid having a content calculated as $P_2O_5$ (acidimetric) of at least 75% by weight is used in step B).

17. The process according to claim 1, wherein a polyphosphoric acid having a content calculated as $P_2O_5$ (acidimetric) of at least 82 is used in step B).

18. The process according to claim 1, wherein a solution or a dispersion/suspension is produced in step B).

19. The process according to claim 1, wherein a polymer selected from the group consisting of polybenzimidazole, poly(pyridines), poly(pyrimidines), polyimidazoles, polybenzothiazoles, polybenzoxazoles, polyoxadiazoles, polyquinoxalines, polythiadiazoles and poly(tetrazapyrenes) is formed in step C).

20. The process according to claim 1, wherein a polymer comprising recurring benzimidazole units of the formula

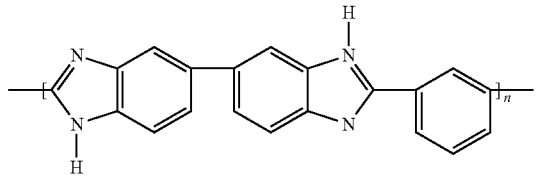 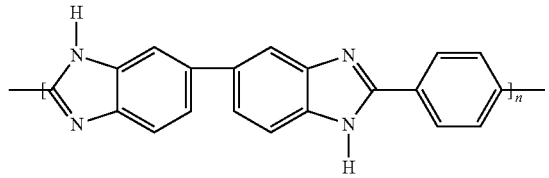

-continued
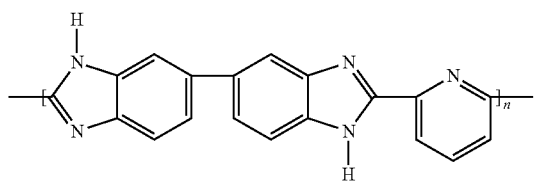 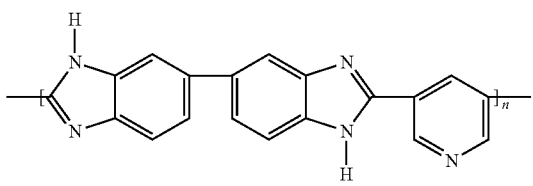
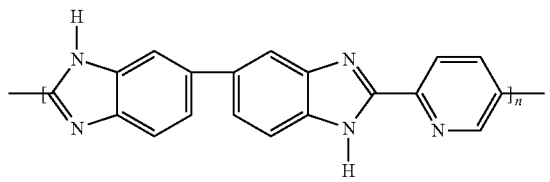 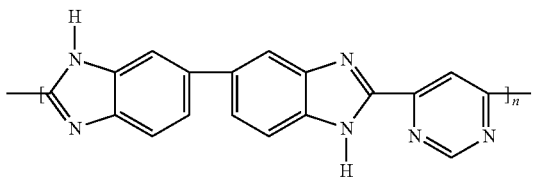
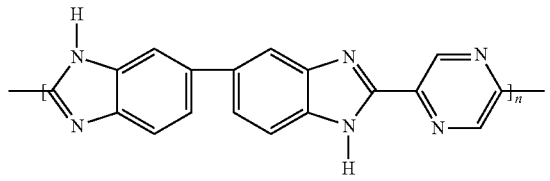 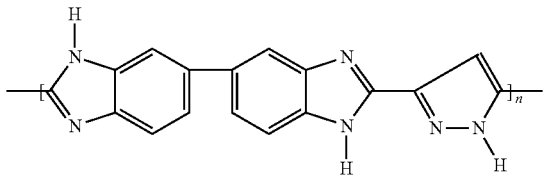
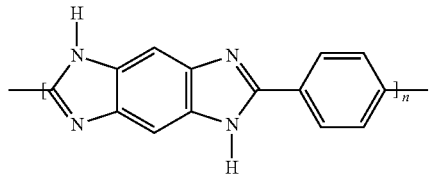 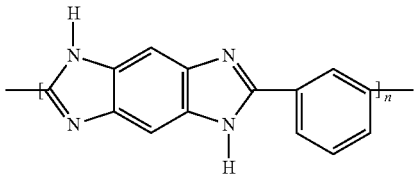
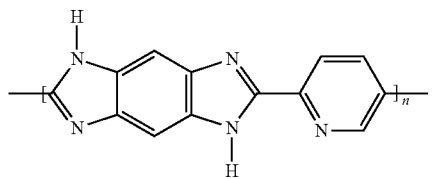 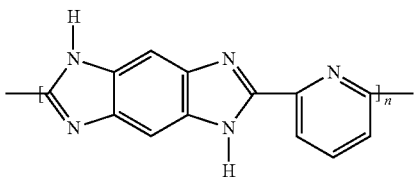
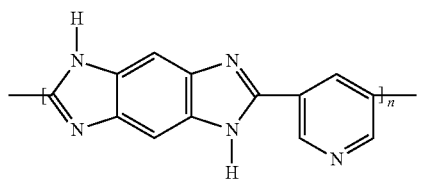 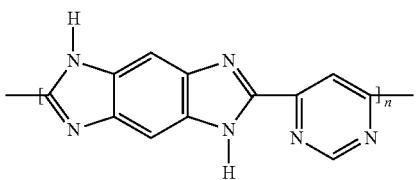
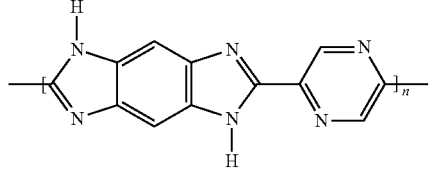 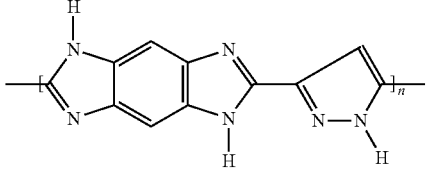
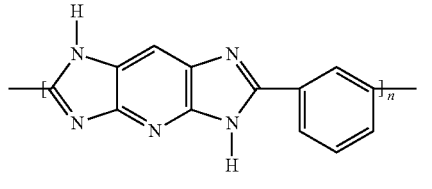 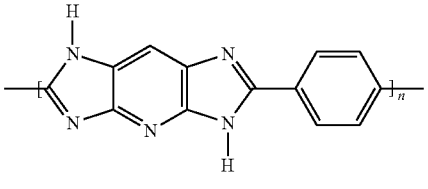
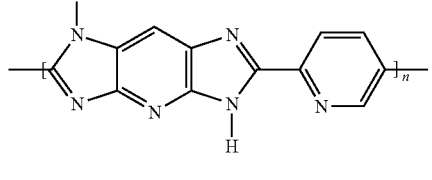 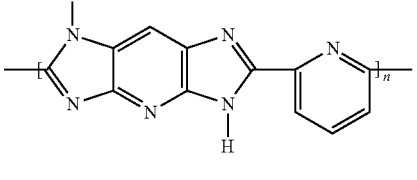

-continued

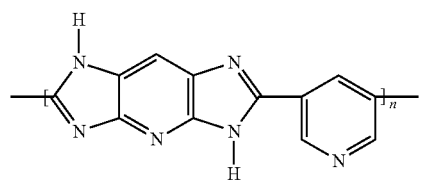 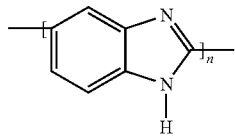

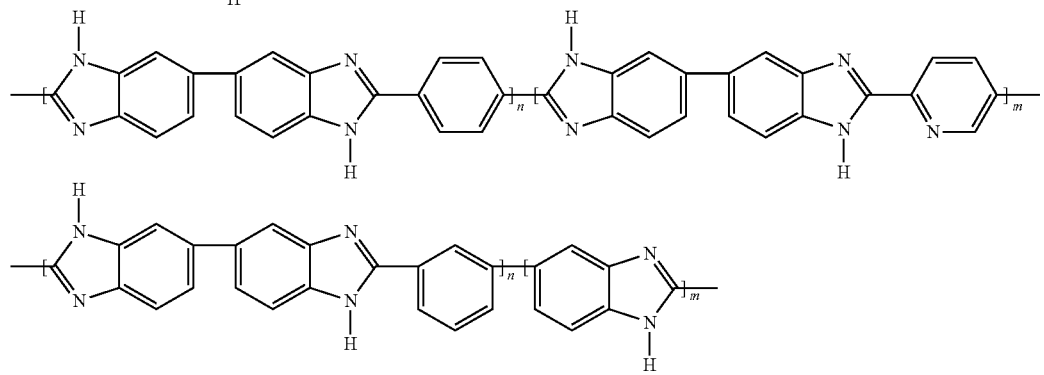

where n and m are each an integer greater than or equal to 10 is formed in step C).

21. The process according to claim 1, wherein the viscosity is adjusted by addition of phosphoric acid after step B) and before step C).

22. The process according to claim 1, wherein the mixture from step B) is heated to temperatures of up to 350° C. to form polyazole polymers, step C) is subsequently carried out and step D) can be entirely or partially omitted.

23. The process according to claim 1, wherein the membrane produced according to step D) is treated in the presence of moisture at temperatures and for a time sufficient for the membrane to be self-supporting and be able to be detached without damage from the support.

24. The process according to claim 1, wherein the treatment of the membrane in step E) is carried out at temperatures from >0° C. to 150° C. in the presence of moisture or water and/or water vapor.

25. The process according to claim 1, wherein the treatment of the membrane in step E) is carried out at temperatures from room temperature (20° C.) to 90° C., in the presence of moisture or water and/or water vapor.

26. The process according to claim 1, wherein an electrode is selected as support in step C) and the treatment according to step E) is carried out in such a way that the membrane formed is no longer self-supporting.

* * * * *